United States Patent Office 3,427,762
Patented Feb. 18, 1969

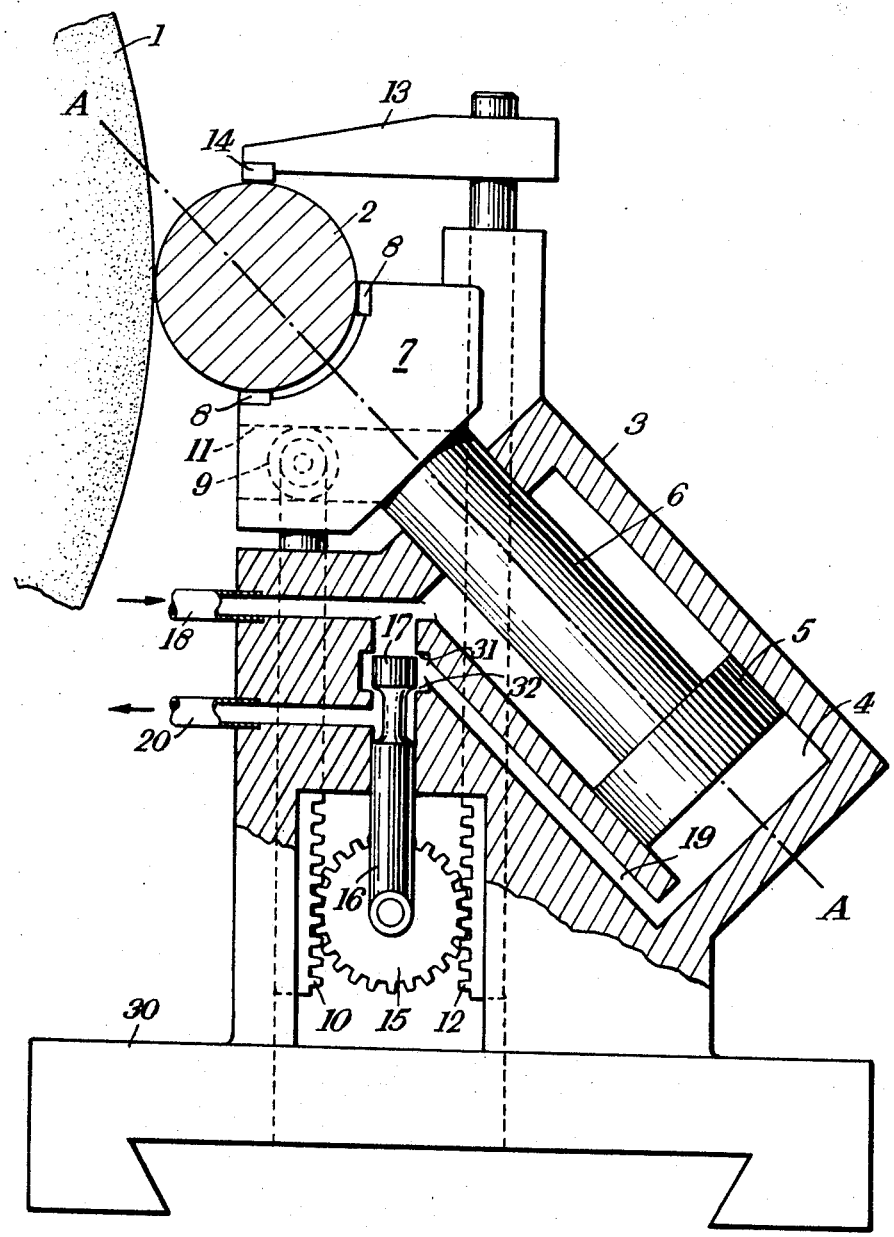

3,427,762
HYDRAULICALLY OPERATED SELF-ADJUSTING STEADY REST
John Penrose Mills, Penn, Wolverhampton, Staffordshire, England, assignor to H. M. Hobson Limited, London, England, a company of Great Britain
Filed Dec. 15, 1966, Ser. No. 601,895
Claims priority, application Great Britain, Dec. 28, 1965, 54,948/65
U.S. Cl. 51—238   2 Claims
Int. Cl. B24b 41/06; F15b 13/10

ABSTRACT OF THE DISCLOSURE

A work steady for a machine tool which exerts on the workpiece a reaction which counterbalances the load exerted by the tool, despite progressive reduction in the size of the workpiece.

---

When a thin, elongated rotary workpiece is subjected to cutting or grinding in a machine tool it is subjected to deflection under the load exerted on it by the tool and it is customary to support it by means of a work steady. The object of the invention is to provide a work steady which will exert on the workpiece a reaction which precisely counterbalances the load exerted on the workpiece by the tool despite the progressive reduction in the size of the workpiece and which is capable of reacting sudden as well as progressive changes in load.

The work steady according to the invention comprises a movable reaction member adapted to bear against the workpiece, means for applying to the reaction member in response to load exerted on it by the workpiece a force which counterbalances the load, and a feeler for sensing changes in size of the workpiece and arranged to effect progressive movement of the reaction member towards the workpiece in response to diminution in size of the workpiece.

One embodiment of a work steady according to the invention will now be described in more detail with reference to the accompanying drawing, which shows the work steady in vertical section.

In the drawing, 1 represents a grinding wheel and 2 a workpiece which is supported at its ends by end supports not shown. The work steady comprises a block 3, which is mounted on a slide 30 which is slidable on a main frame (not shown) and in which is formed a cylinder 4 containing a piston 5. The piston rod 6 carries a reaction member 7, which engages the workpiece 2 by means of two tungsten carbide pads 8 and supports it against the load exerted by the grinding wheel which acts in the direction of the line AA. In use, the workpiece 2 is rotated by a motor (not shown).

A roller 9, mounted on the upper end of a rack 10, engages a slot 11 in the reaction member 7. Another rack 12 carries at its upper end a feeler 13 which engages the workpiece through the agency of a tungsten carbide pad 14. The racks 10, 12 engage a common pinion 15 which is rotatably mounted on the stem 16 of a hydraulic control valve 17. The valve 17 controls communication between a high pressure oil inlet 18, a passage 19 leading to the lower end of the cylinder 4 and a drain outlet 20. The inlet 18 communicates directly with the upper end of the cylinder 4. As will be seen, the valve 17 controls the effective area of orifices 31, 32 through which oil flows from the inlet 18 to the outlet 20, and the hydraulic pressure in the passage 19 and therefore in the lower end of the cylinder 4 will be determined by the position of the valve.

Prior to the commencement of grinding, the valve 17 occupies a position such that the hydraulic pressures acting on opposite sides of the piston 5 are precisely balanced. Thus in a typical case, in which the effective area of the upper surface of the piston 5 is half that of its lower surface and the pressure of the oil entering the inlet 18 is 100 p.s.i., the pressure in the passage 19 and the lower end of the cylinder 4 will be 50 p.s.i. The hydraulic pressure acting on the upper end of the valve 17 acts through the rack 12 to hold the feeler 13 against the workpiece.

When, during grinding, the workpiece is subjected to load in the direction AA, the piston 5 tends to move downwardly in the cylinder 4. As in result the rack 10 is depressed by the roller 9 and moves the pinion 15 and valve 17 downwardly to increase the effective area of the orifice 31 and decrease the effective area of the orifice 32 thereby increasing the pressure at the lower end of the cylinder 4 sufficiently to cause the reaction member 7 to balance the load. Thus the reaction member 7 is effective exectly to balance the load on the workpiece and prevent it from deflecting. As the size of the workpiece is reduced, the resultant downward movement of the feeler 13 will be effective, through the rack 12, the pinion 15 and the control valve 17 to raise the piston 6 and enable the reaction member 7 to maintain contact with the workpiece. As the reaction member moves to maintain contact with the workpiece it will raise the roller 9 to reset the control valve 17.

The reaction member will normally be positioned centrally of the workpiece and may engage it over any desired length. In the case of very long workpieces, two or more work steadies of the kind illustrated may be provided for engaging the workpiece at spaced points.

What I claim as my invention and desire to secure by Letters Patent is:

1. A work steady, for supporting a workpiece in a machine tool, comprising a movable reaction member adapted to bear against the workpiece, a hydraulic cylinder containing a piston having a piston rod carrying the reaction member, a valve arranged to establish according to its position a variable hydraulic pressure difference between opposite ends of the cylinder which counteracts the load exerted on the reaction member by the workpiece, a feeler for sensing changes in size of the workpiece, and connections between the reaction member and the valve and between the feeler and the valve for adjusting the valve to maintain the reaction member in contact with the workpiece and under a hydraulic pressure difference which counterbalances the load.

2. A work steady as claimed in claim 1, wherein the valve carries a rotatable pinion which meshes with racks connected respectively to the reaction member and to the feeler.

References Cited

UNITED STATES PATENTS

| 2,160,378 | 5/1939 | Balsiger | 51—238 |
| 3,171,234 | 3/1965 | Hill | 51—105 |

FOREIGN PATENTS 712,685   7/1945   Great Britain.

MYRON C. KRUSE, *Primary Examiner.*

U.S. Cl. X.R.
91—390